United States Patent [19]

Francis

[11] 4,084,789
[45] Apr. 18, 1978

[54] STABILIZING JACK
[75] Inventor: Melvin A. Francis, Knoxville, Tenn.
[73] Assignee: Industrial Drives, Inc., Knoxville, Tenn.
[21] Appl. No.: 801,608
[22] Filed: May 31, 1977
[51] Int. Cl.² .............................................. B66F 1/06
[52] U.S. Cl. .................................................. 254/86 R
[58] Field of Search ............... 254/80 R; 280/763-766
[56] References Cited
U.S. PATENT DOCUMENTS

| 3,614,064 | 5/1969 | Bennett | 254/86 R |
|---|---|---|---|
| 3,825,279 | 7/1974 | Schmeichel | 254/86 R |
| 3,879,055 | 4/1975 | Sill et al. | 254/86 R |

Primary Examiner—Robert C. Watson
Attorney, Agent, or Firm—Fitch, Even, Tabin & Luedeka

[57] ABSTRACT

An improved jack for a ground vehicle including a lever operated jacking mechanism substantially encompassing an elongated rack means, a tubular member affixed at one of its ends to said jacking mechanism and telescopically receiving one end of said rack means therein, ground engaging means pivotally secured to the opposite end of the rack means and bracket means including a channel portion receiving therein the end of said tubular member opposite the jacking mechanism. The improvement comprises means for securing the jack in a generally horizontal storage position comprising an elongated rigid rod, means disposed on the jack at a location spaced apart from the bracket means and defining a first opening for receiving one end of the securing rod and non-pivotal means associated with the bracket means and defining a second opening for receiving the opposite end of the securing rod. The second opening is of a generally tubular geometry with the longitudinal axis being fixed in a generally horizontal orientation when the jack is in its storage position.

5 Claims, 9 Drawing Figures

STABILIZING JACK

The present invention relates generally to the field of stabilizing and leveling jacks for land vehicles, especially motor homes and other recreational vehicles. More specifically, the invention relates to means for attaching and securing an adjustable jack in a storage position and an extended, ground engaging position.

When a land vehicle, such as a motor home or trailer, is parked in a campground, trailer park, by the side of a road, or even in one's driveway, it is generally desirable to provide means for supporting and stabilizing the vehicle, other than the wheels used for traveling purposes. Adjustable jacks are frequently used and serve a variety of purposes. For example, jacks of various designs are frequently used to place a trailer or motor home on rigid legs, removing the weight from a spring-mounted axle. This system of rigid support eliminates rocking motion which may be caused by wind or activity within the vehicle. Jacks also lift the vehicle weight from the tires, extending the life of the tires. This is particularly important when the vehicle is parked for extended periods of time. Adjustable jacks further allow one to level the trailer on nonlevel terrain. It has therefore been common in the motor home and trailer industries to provide adjustable jacks for all four corners of a generally rectangular trailer. (Hereinafter "trailer" will be intended to include self-powered, as well as nonpowered, land vehicles).

While jacks perform important functions when the trailer is stationary, trailers are inherently mobile. A downwardly extending jack can strike an obstruction during travel, injuring the jack and the trailer. Therefore, storage positions are provided for the jacks during travel. As disclosed in U.S. Pat. Nos. 3,614,064 and 3,580,543, jacks have been both removably and permanently attached to trailer frames. Removably-attached jacks are generally stored at a location within the trailer or towing vehicle, whereas permanently attached jacks are generally pivotably attached to the trailer, allowing them to be pivoted out the way during travel. However, the attachment systems known to the inventor have not proven entirely satisfactory. For example, permanently attached jacks, such as those attached by welding, are not easily attached and cannot be removed for repair, when this becomes necessary. In addition, permanently attached jacks require storage space for unattached, yet necessary, parts, such as a jacking lever. Those jacks which are attached only during use require storage space when the vehicle is in motion. Unfortunately, space is at a premium, especially in smaller trailers. Further, where brackets are used to temporarily secure the jack to the vehicle different brackets must be provided for differently shaped frames.

A further problem encountered with permanently attached jacks is that means are required for securing the jack in the storage position. As noted above, permanently attached jacks are generally provided with pivotal means, for movement of the jack between a generally horizontal storage position and a generally vertical ground engaging position, and securing means for maintaining the jack in the storage position during travel. Such securing means obviously must be strong and reliable. At the same time it is desirable for the securing means to be compact, add minimal weight to the vehicle and also use a minimal number of parts in addition to those necessary for the jacking function. Some prior art devices have used removable pins and slots, or springs, but these have not proven satisfactory. Such equipment adds excess weight during travel and serves no useful purpose when the jack is in use, and thus is easily misplaced or deformed.

Strong winds and physical activity apply relatively great pressures to a trailer so that it is necessary for jacks to provide a stable base. It has been determined that the orientation of a ground engaging jack, relative to the ground affects the stability of the trailer.

Still further, many known jacks provide only a stabilizing force and are incapable of exerting a lifting force to the vehicle.

It is therefore an object of the present invention to provide an improved jack for a land vehicle. It is another object to provide a jack of the type described which includes an improved means for attaching the jack to a land vehicle in a semi-permanent manner. It is another object to provide an improved adjustable jack which is self-storing when the jack is attached to a vehicle. It is a further object to provide a stabilizing and lifting jack of improved stability when in a ground engaging position. It is a still further object to provide a jack for a land vehicle that provides both stabilizing and lifting force to a land vehicle. Other objects and advantages of the invention will become apparent from the following detailed description, particularly when taken with reference to the drawings in which:

Figure 1:
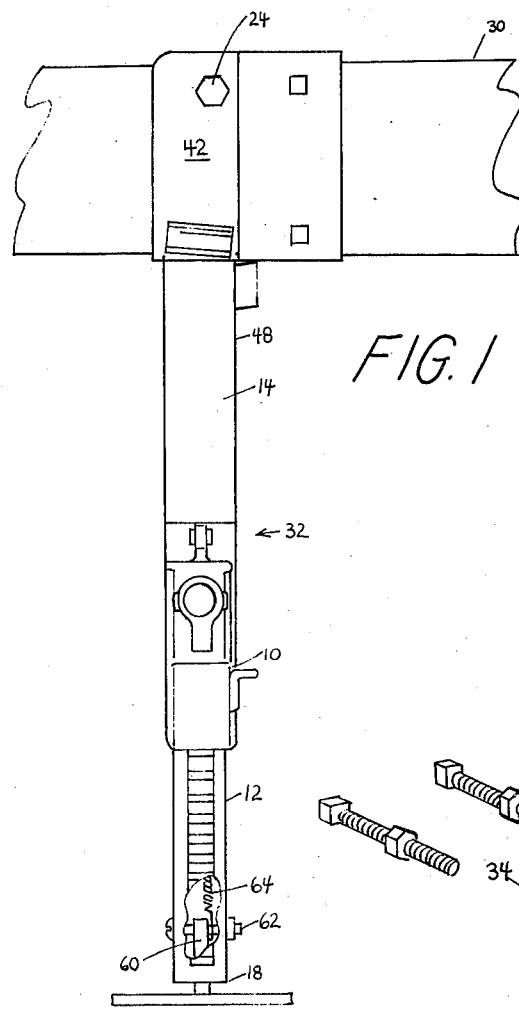
FIG. 1 is a plan view of an attached stabilizing jack in an extended position.
Figure 3A:
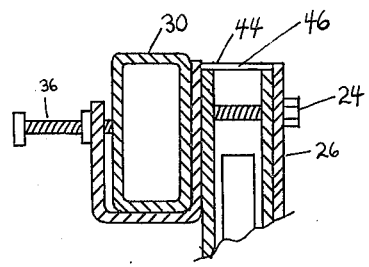
FIGS. 3a and 3b are enlarged sectional views taken along line 3—3 in FIG. 2, including modified forms of the frame.
Figure 3B:
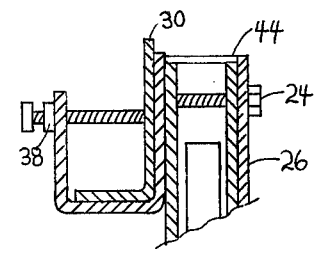
Figure 2:
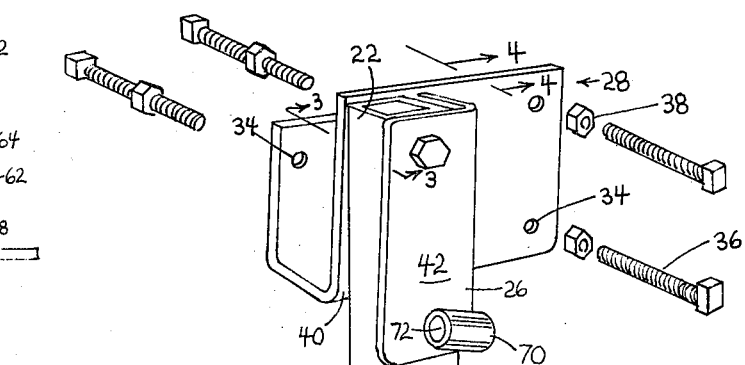
FIG. 2 is a perspective view of a stabilizing jack in a storage position.
Figure 4A:
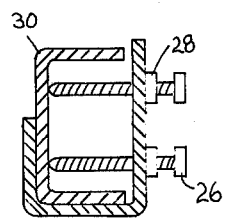
FIGS. 4a and 4b are enlarged sectional views taken along line 4—4 in FIG. 2, including modified forms of the frame.
Figure 4B:
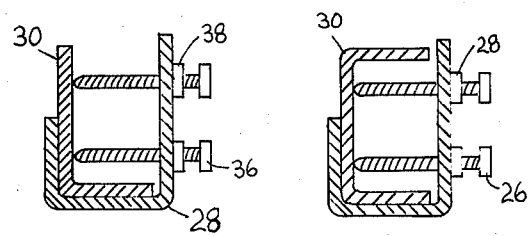

In accordance with the present invention, conventional jacking mechanism 10, such as an automobile bumper jack, encompasses an elongated rack means 12. An elongated tubular section 14 is attached at one of its ends 16 to the jacking mechanism 10, telescopically receiving one end (not shown) of the rack means 12. Attached to the end 18 of the rack 12 opposite the tubular section is a pivotal ground engaging member 20. That end 22 of the tubular section 14 opposite the ground engaging member 20 is attached by pivotal means 24 in a channel portion 26 of a bracket means 28 attached to a vehicle frame 30. Means are provided for securing the jack in a storage position. Means are also provided for maintaining the jack in a ground-engaging position.

Referring more particularly to the drawings, in the depicted embodiment, the jack 32 includes an elongated bracket 28 generally U-shaped in cross-section and adapted to receive therein a generally horizontal vehicle frame member 30. Pairs of threaded openings 34 are provided on both legs of the U-shaped bracket and in both horizontal and vertical relationships to accommodate any of a variety of frame shapes. The frame 30 may be L-shaped, C-shaped or rectangular in cross-section as shown in FIGS. 3a, 3b, 4a, and 4b. A plurality of bolts 36 threaded through openings 34 bear upon the frame 30 thus attaching the bracket 28 to the frame 30 and preventing rotation of the frame within the bracket 28. Locknuts 38 prevent the bolts 36 from gradual withdrawal caused by vibration and other motion.

Attached to the bracket 28 is an elongated channel portion 26, comprising two generally parallel side walls 40 and 42 and a perpendicular base wall 44 defining an elongated surface 46. The axis of the channel portion is disposed in a generally vertical orientation when the bracket 28 is attached to the frame 30 such that the elongated surface 46 extends substantially vertically downwardly from the vehicle frame.

Received within the channel portion 26, between the side walls 40 and 42 is one end 22 of an elongated tubular member 14. A pivot pin 24 secured in the side walls 40 and 42 secures the end of the tubular member within the channel portion 26 to provide for pivotal motion of the tubular section between a generally horizontal storage position and a generally vertical ground engaging position, in which an outer edge 48 of the tubular section 14 is juxtaposed to the channel portion surface 46.

A support ledge 50 is provided on the tubular section outer edge 48 immediately below the location of the bottom edge 52 of the channel portion 26 when the jack is in its ground engaging position. In this position this support ledge 50 is contacted by the channel portion and supports a portion of the vehicle weight transmitted through the bracket 28, thus providing a safety feature and reducing the wear on the pivot pin 24, among other things.

The end 16 of the tubular member 14 opposite its pivoted end 22 is affixed to a conventional lever-operated jacking mechanism 10 encompassing a conventional hollow tubular rack 12, one end of the rack 12 being telescopically received in the tubular section 14. This jacking mechanism is of the common automobile jack type and includes a rigid, elongated jacking lever 54 slidably received in the alternating lifting section 56 of the jacking mechanism.

A ground engaging member 20 comprising a plate 58 and a lug 60 is pivotally attached to one end 18 of the rack 12 as by a pivot pin 62 to permit the plate 58 to adapt to irregular terrain. Attached between the pivot pin 24 and the pivot pin 62 is a coil spring 64, which is disposed within the tubular rack and which biases the rack 12 toward a fully telescoped position within the tubular member 14.

As shown in the depicted embodiment, defined within the ground engaging member 20 is an opening 66 extending through the thickness of the plate 58 adapted to receive therethrough a rigid, elongated securing rod 68, preferably comprising the jacking lever 54. The opening 66 is only slightly larger than the cross-section of the securing rod to minimize pivotal motion, while allowing sliding motion of the rod therethrough.

When the jack 32 is pivoted to the storage position, the opening 66 is aligned with, and preferably above a hollow tubular member 70 affixed to the channel portion 26 of the bracket 28. This tubular member 70 is also adapted to slidably receive the opposite end of the rod 68. In the depicted embodiment, the tubular member 70 defines an elongated opening 72 through which the rod 68 is passed such that the rod projects from both ends of the elongated opening. The cross-sectional dimensions of the opening 72 are chosen such that there is relatively small clearance between the rod and the opening wall. Further, the tubular member 70 is fixedly secured to the bracket 28 with the longitudinal axis of the opening 72 of the tubular member being oriented generally horizontally. Thus, when the rod 68 is disposed within the opening 72, the rod is held generally parallel to the horizontal and is precluded from rotating about a vertical axis.

The rod 68 has a length dimension greater than the distance between the opening 66 and the opening 72 when the jack is in the storage position. Thus, when the rigid rod 68 is inserted through the opening 66 and thence through the opening 72 when the jack is in the storage position, the jack 32 is maintained in a generally horizontal position by means of the essentially nonpivotal securement of the rigid securing rod 68 to both the ground engaging member 20 and the channel portion 26 of the bracket 28 attached to the vehicle frame 30.

One end of the securing rod 68 preferably includes knob means 74 having dimensions which prohibit its passage through the opening 66. The opposite end of the securing rod 68 includes a lateral bore 76 adapted to receive a spring clip 78 after insertion through the tubular member 70, thereby locking the rod in the storage position. Thus, the entire jack is stored at one location if the jacking lever 54 is used as the securing rod 68.

Figure 5:
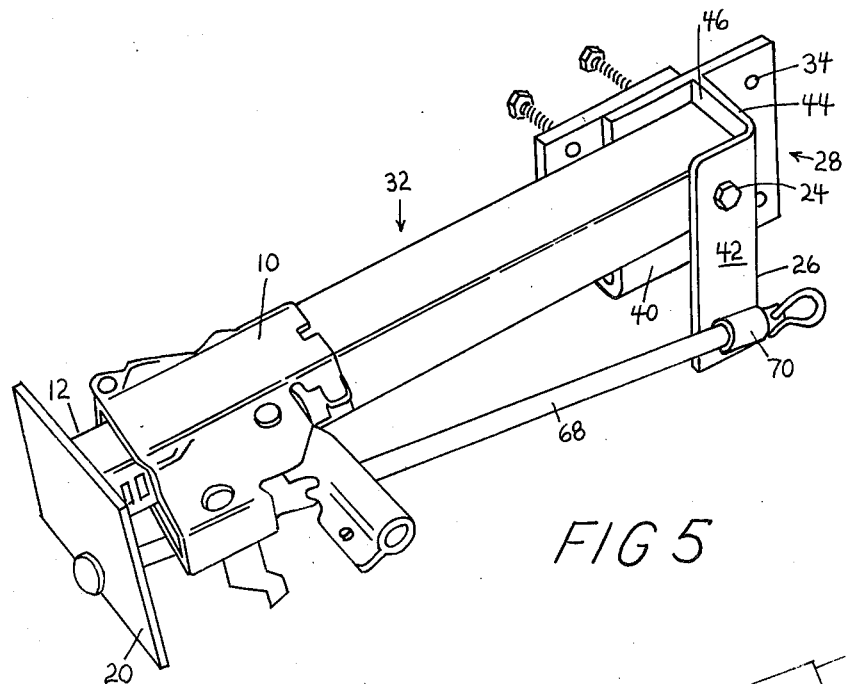
FIG. 5 is a perspective view of a stabilizing jack in a storage position.
Figure 6:
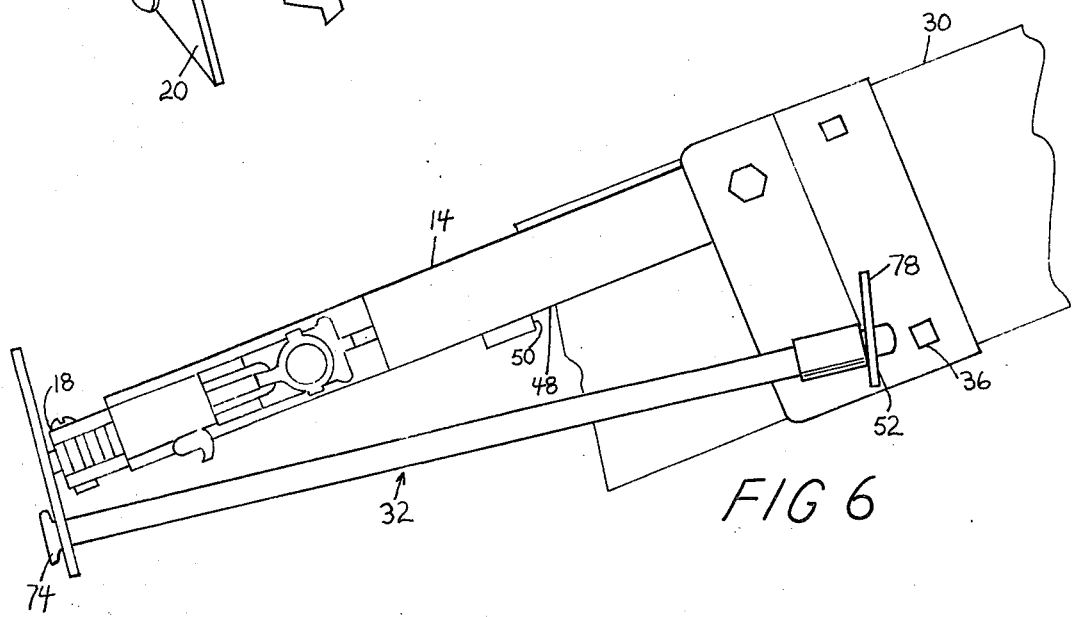
FIG. 6 is a plan view, partially in section, of an attached stabilizing jack in an extended position.

As shown in FIG. 5, the securing rod 68 is firmly engaged whether or not the spring clip 78 is inserted. The weight of the jack, which is pivotally attached in the channel portion 26, applies torque to the rigid securing rod 68. The applied torque is then transmitted by the rigid rod to the nonpivotal tubular member 70 affixed to the channel portion to securely bind the rod within the tubular member 70. Thus, the jack must be lifted to permit withdrawal of the rod 68 from the tubular member 70. In addition, in a preferred embodiment, the opening 66 is located above the member 70 when in the storage position, so that the knob means 74 prohibits downward longitudinal sliding motion and the rod must be lifted to be withdrawn.

The jack is removed from the storage position and put in use by pivoting the jack upwardly to permit longitudinal sliding withdrawal of the rod 68 from the tubular member 70. The jack is then pivoted to the generally vertical, ground engaging position.

Figure 7:
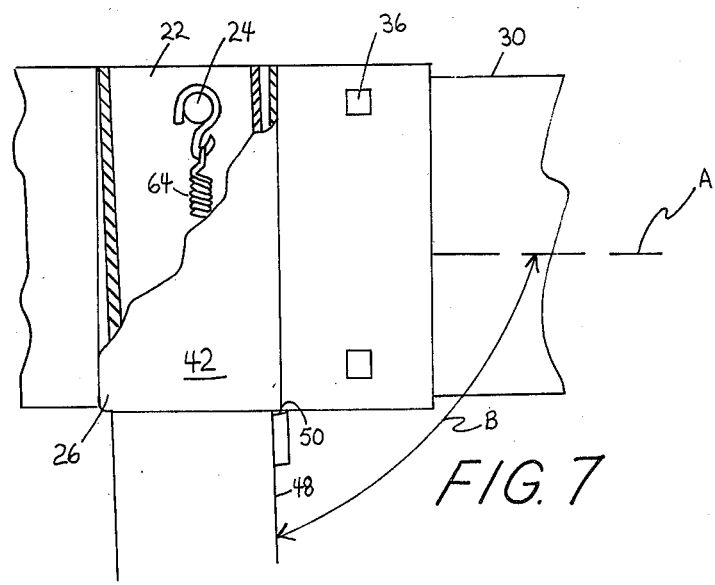
FIG. 7 is an enlarged plan view, partially in section, of an attaching means for a stabilizing jack as shown in FIG. 6.

In the ground engaging position, the longitudinal axis of the jack forms an acute stabilizing angle B (FIG. 7) with the longitudinal axis of the trailer (which is horizontal when the trailer is level). The acute angle is greater than about 80 degrees, and preferably about 85 degrees. This angle is accomplished by providing that the distance from the axis of the pivot pin 24 to the outer edge 48 of the tubular member 14 is less than the distance from the pivot pin 24 axis to the elongated surface 46 of the channel 26. Thus, in the ground engaging position of the jack, lift forces are transferred from the tubular section 14 to the bracket (hence to the vehicle frame) through the pivot pin 24, as well as through the support ledge 50 to the elongated surface 46 of the channel portion 26. This angular relationship thus provides for a portion of the lift forces to be removed from the pivot pin 24. The spaced relation of the tubular section edge 48 relative to the elongated surface 46 in the vicinity of the pivot pin 24 also allows free pivotal motion of the jack to and from its storage position.

When the jack is released from its storage position, the tubular section pivots freely and automatically achieves the desired angular position because the spatial relationship of the pivot axis of the pivot pin 24 relative to the longitudinal axis of the tubular member 14, i.e. the pivot axis is offset from the longitudinal axis. In a preferred embodiment, this offset is about ¼ inch. The torque developed by the resulting weight imbalance forces the jack to the angular position relative to the vertical.

It is noted that preferably a jack is located on each corner of a vehicle for maximum stabilization. Further, the jack on a forward corner desirably will be angled forwardly and outwardly of the vehicle while a jack on a rear corner will be angled rearwardly and outwardly of the vehicle.

Conventional operation of the jacking lever 54, in combination with the jacking mechanism 56, lowers the rack 12 through the tube 14 and jacking mechanism 56 until the ground engaging member 20 contacts the ground. The pivotal ground engaging member adjusts for irregularities in the terrain. Further lowering of the rack develops lift forces tending to raise the bracket, and thus stabilizes or lifts the vehicle relative to the ground. Similar action by four jacks, each set at a different corner of the vehicle can remove the vehicle weight from the springs, axles and tires, forming a solid support system.

The disclosed invention provides for easy attachment of the jack on a variety of frames and removal as desired. The means for securing the jack in its storage position provides no loose pieces that may be lost or misplaced. The jacking lever is not only stored with the jack, but also provides the means for securing the jack in its storage position.

While a preferred embodiment has been shown and described, it will be understood that there is no intent to limit the invention by such disclosure, but rather, it is intended to cover all modifications and alternate constructions falling within the spirit and scope of the invention as defined in the appended claims.

I claim:

1. In a jack for a ground vehicle including a lever operated jacking mechanism substantially encompassing an elongated rack means, a tubular member affixed at one of its ends to said jacking mechanism and telescopically receiving one end of said rack means therein, ground engaging means pivotally secured to the opposite end of said rack means, bracket means including a channel portion receiving therein said end of said tubular member opposite said jacking mechanism, pivot means securing said tubular member to said channel portion, the improvement comprising means for securing said jack in a generally horizontal storage position comprising an elongated rigid rod, means disposed on said jack at a location spaced apart from said bracket means and defining a first opening for receiving one end of said securing rod and nonpivotal means associated with said bracket means and defining a second opening in proximity with said pivot means for receiving the opposite end of said securing rod, said second opening being spaced from said first opening and of a generally tubular geometry with the longitudinal axis thereof being fixedly oriented substantially horizontally when said jack is in its storage position.

2. The device as described in claim 1 wherein said channel portion includes a bottom edge secured to said bracket and an elongated surface that extends substantially vertically downwardly from said vehicle when said bracket is attached to said vehicle, said one end of said tubular member being disposed in said channel portion with one outer edge of said tubular member being juxtaposed to said surface of said channel portion, the distance from the pivot axis of said end of said tubular member within said channel to the outer edge of said tubular member being less than the distance from said pivot axis to said surface, whereby when said jack is in a ground engaging position, said outer edge of said tubular member is in contact with said bottom edge of said channel portion and the longitudinal axis of said tubular member defines an acute angle with the downward extension of said surface.

3. The device as described in claim 1 wherein said tubular member includes a support ledge positioned immediately below and in contact with said channel portion when said jack is in a ground engaging position.

4. The device as described in claim 1 wherein said nonpivotal tubular means is disposed at a level below the level of said opening in said ground engaging means when said jack is in a secured position.

5. In a jack for a ground vehicle including a lever operated jacking mechanism substantially encompassing an elongated rack means, a tubular member affixed at one of its ends to said jacking mechanism and telescopically receiving one end of said rack means therein, ground engaging means pivotally secured to the opposite end of said rack means, the improvement comprising bracket means including a channel portion having a bottom edge and adapted to pivotally receive that end of said tubular member opposite said jacking mechanism, means securing said bracket means to a vehicle, means defining an elongated surface on said channel portion that extends substantially vertically downwardly from said vehicle when said bracket is in position on said vehicle, means pivotally securing said end of said tubular member in said channel portion with one outer edge of said tubular member being juxtaposed to said elongated surface on said channel portion, the distance from the pivot axis to the outer edge of said tubular member being less than the distance from said pivot axis to said surface, and a support ledge fixedly attached to said tubular member whereby when said jack is in a ground engaging position, said support ledge is immediately below and in contact with said bottom edge of said channel portion and said outer edge of said tubular member is in contact with said bottom edge of said channel portion and the longitudinal axis of said tubular member defines an acute angle with the horizontal.

* * * * *